(12) United States Patent
Koide et al.

(10) Patent No.: US 11,556,819 B2
(45) Date of Patent: Jan. 17, 2023

(54) COLLECTION APPARATUS, COLLECTION METHOD, AND COLLECTION PROGRAM

(71) Applicant: NIPPON TELEGRAPH AND TELEPHONE CORPORATION, Tokyo (JP)

(72) Inventors: Takashi Koide, Musashino (JP); Daiki Chiba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 260 days.

(21) Appl. No.: 16/958,158

(22) PCT Filed: Sep. 19, 2018

(86) PCT No.: PCT/JP2018/034625
§ 371 (c)(1),
(2) Date: Jun. 26, 2020

(87) PCT Pub. No.: WO2019/142399
PCT Pub. Date: Jul. 25, 2019

(65) Prior Publication Data
US 2020/0364589 A1    Nov. 19, 2020

(30) Foreign Application Priority Data
Jan. 17, 2018    (JP) .............................. JP2018-005694

(51) Int. Cl.
*G06N 5/04* (2006.01)
*G06F 16/955* (2019.01)

(52) U.S. Cl.
CPC ............. *G06N 5/04* (2013.01); *G06F 16/955* (2019.01)

(58) Field of Classification Search
CPC ............. H04L 63/0236; H04L 63/1491; H04L 63/145; H04L 63/1483; G06F 16/955; G06F 21/6227; G06F 16/9566; G06N 5/04
See application file for complete search history.

(56) References Cited

U.S. PATENT DOCUMENTS

| 2009/0132529 A1* | 5/2009 | Gibbs ................. G06F 16/9566 707/999.005 |
| 2012/0158705 A1* | 6/2012 | Konig ..................... G06F 16/58 707/723 |
| 2018/0365580 A1* | 12/2018 | Musuvathi ............ G06F 16/951 |

FOREIGN PATENT DOCUMENTS

| JP | 2004-046739 A | 2/2004 |
| JP | 2016-170524 A | 9/2016 |

(Continued)

OTHER PUBLICATIONS

International Search Report and Written Opinion dated Nov. 13, 2018 for PCT/JP2018/034625 filed on Sep. 19, 2018, 8 pages including English Translation of the International Search Report.

(Continued)

*Primary Examiner* — Benjamin M Thieu
(74) *Attorney, Agent, or Firm* — Xsensus LLP

(57) ABSTRACT

A collection apparatus that collects a URL of a Web page that leads to user operation and includes a search query generation unit that generates a search query by combining a digital content name and an associated keyword of the digital content. There is a fitness prediction unit that predicts a degree to which a Web page that leads to user operation is output as a search result when a search is performed by using the generated search query, a determination unit that searches for a Web page by using a search query in a search order that is based on the predicted degree, and determines analysis priority of a URL of a Web page on the basis of the (Continued)

degree and search result information. Further, there is a communication unit that outputs the URL of the retrieved Web page and the analysis priority of the URL.

7 Claims, 13 Drawing Sheets

(56) References Cited

FOREIGN PATENT DOCUMENTS

| WO | 2016/132992 A1 | 8/2016 |
| WO | 2016/140038 A1 | 9/2016 |

OTHER PUBLICATIONS

Invernizzi, et al., "Evilseed: A Guided Approach to Finding Malicious Web Pages," IEEE Symposium on Security and Privacy, 2012, pp. 428-442.

Nelms, et al., "Towards Measuring and Mitigating Social Engineering Software Download Attacks," Proceedings of the 25th USENIX Conference on Security Symposium, USENIX Association, Austin, TX, Aug. 10-12, 2016, pp. 773-789.

\* cited by examiner

FIG.3

| SERIAL NUMBER | CATEGORY | URL OF COLLECTION DESTINATION Web PAGE |
|---|---|---|
| 1 | Movie | http://movie1.example.com, http://movie2.example.net |
| 2 | Game | http://game1.example.org |
| 3 | Software | http://soft1.example.com, http://soft2.example.net, http://soft3.example.org |
| 4 | Book | http://book1.example.com, http://book2.example.net |
| 5 | Music | http://music1.example.com, http://music2.example.net, http://music3.example.org |
| ... | ... | ... |

FIG.4

| SERIAL NUMBER | SEARCH QUERY | CATEGORY | FITNESS |
|---|---|---|---|
| 1 | MovieA movie | Movie | 0.2 |
| 2 | MovieA free download | Movie | 0.7 |
| ... | ... | ... | ... |
| 101 | MovieA online | Movie | 0 |
| 102 | MovieA stream online | Movie | 0.7 |
| ... | ... | ... | ... |
| 201 | GameA play | Game | 0.3 |
| 202 | GameA crack torrent download | Game | 0.9 |
| ... | ... | ... | ... |

FIG.5

| SERIAL NUMBER | COMMUNICATION DESTINATION | | | CATEGORY |
|---|---|---|---|---|
| | DOMAIN NAME | URL | ... | |
| 1 | movie-w1.example.com | - | ... | Movie |
| 2 | movie-w2.example.com | - | ... | Movie |
| ... | ... | ... | ... | ... |
| 101 | game-w1.example.com | - | ... | Game |
| 102 | game-w2.example.com | - | ... | Game |
| ... | ... | ... | ... | ... |
| 201 | book-w1.example.com | - | ... | Book |
| 202 | book-w1.example.com | - | ... | Book |
| ... | ... | ... | ... | ... |
| 301 | - | http://movie-w3.example.com/movie/ | ... | Movie |
| 302 | - | http://movie-w4.example.com/movie/ | ... | Movie |
| ... | ... | ... | ... | ... |

FIG.6

| SERIAL NUMBER | FIRST KEYWORD | ADDITIONAL INFORMATION | | |
|---|---|---|---|---|
| | | CATEGORY | COLLECTION DESTINATION Web PAGE | ORDER |
| 1 | MovieA | Movie | http://movie1.example.com | 1 |
| 2 | MovieB | Movie | http://movie1.example.com | 2 |
| ... | ... | ... | ... | ... |
| 101 | SoftwareA | Software | http://soft1.example.com | 1 |
| 102 | SoftwareB | Software | http://soft1.example.com | 2 |
| ... | ... | ... | ... | ... |
| 201 | GameA | Game | http://game1.example.com | 1 |
| 202 | GameB | Game | http://game1.example.com | 2 |
| ... | ... | ... | ... | ... |
| 102 | BookA | Book | http://book1.example.com | 1 |
| ... | BookB | Book | http://book1.example.com | 2 |

FIG.7

| SERIAL NUMBER | SECOND KEYWORD | INPUT | CATEGORY | OUTPUT |
|---|---|---|---|---|
| 1 | download | MovieA free | Movie | MovieA free download |
| 2 | Stream, online | MovieA free | Movie | MovieA free stream online |
| ... | ... | ... | ... | ... |
| 101 | download | GameA download | Game | GameA download torrent |
| 102 | torrent | GameA download | Game | GameA download crack |
| ... | ... | ... | ... | ... |
| 201 | zip | BookA free | Book | BookA free zip |
| 202 | pdf | BookA free | Book | BookA free pdf |

FIG.8

| SERIAL NUMBER | SEARCH QUERY | CATEGORY |
|---|---|---|
| 1 | MovieA free | Movie |
| 2 | MovieA free download | Movie |
| 3 | MovieA free torrent | Movie |
| 4 | MovieA free download torrent | Movie |
| 5 | MovieA stream online | Movie |
| ... | ... | ... |
| 101 | GameA crack | Game |
| 102 | GameA crack download | Game |
| 103 | GameA crack torrent | Game |
| 104 | GameA crack torrent download | Game |
| 105 | GameA iso download | Game |
| ... | ... | ... |

FIG.9

| SERIAL NUMBER | SEARCH QUERY | FEATURE INFORMATION | | | | | | | |
|---|---|---|---|---|---|---|---|---|---|
| | | Bag of Words | | SECOND KEYWORD NUMBER | NUMBER OF WORDS | NUMBER OF CHARACTERS | FIRST KEYWORD ORDER | CATEGORY | |
| | | free | down-load | ... | | | | | Movie | ... |
| 1 | MovieA free | 1 | 0 | ... | 1 | 2 | 11 | 1 | 1 | ... |
| 2 | MovieA free download | 1 | 1 | ... | 2 | 3 | 20 | 1 | 1 | ... |
| ... | ... | ... | ... | ... | ... | ... | ... | ... | ... | ... |
| 101 | GameA download | 0 | 1 | ... | 1 | 2 | 14 | 3 | 0 | ... |
| 102 | GameA download crack | 0 | 1 | ... | 2 | 3 | 20 | 3 | 0 | ... |
| ... | ... | ... | ... | ... | ... | ... | ... | ... | ... | ... |
| 201 | BookA free download | 1 | 1 | ... | 1 | 3 | 19 | 5 | 0 | ... |
| 202 | BookA free download zip | 1 | 1 | ... | 2 | 4 | 23 | 5 | 0 | ... |

| SERIAL NUMBER | URL | ANALYSIS PRIORITY |
|---|---|---|
| 1 | http://movie.example.com/ | 0.9 |
| 2 | http://game.example.com/ | 0.8 |
| ... | ... | ... |

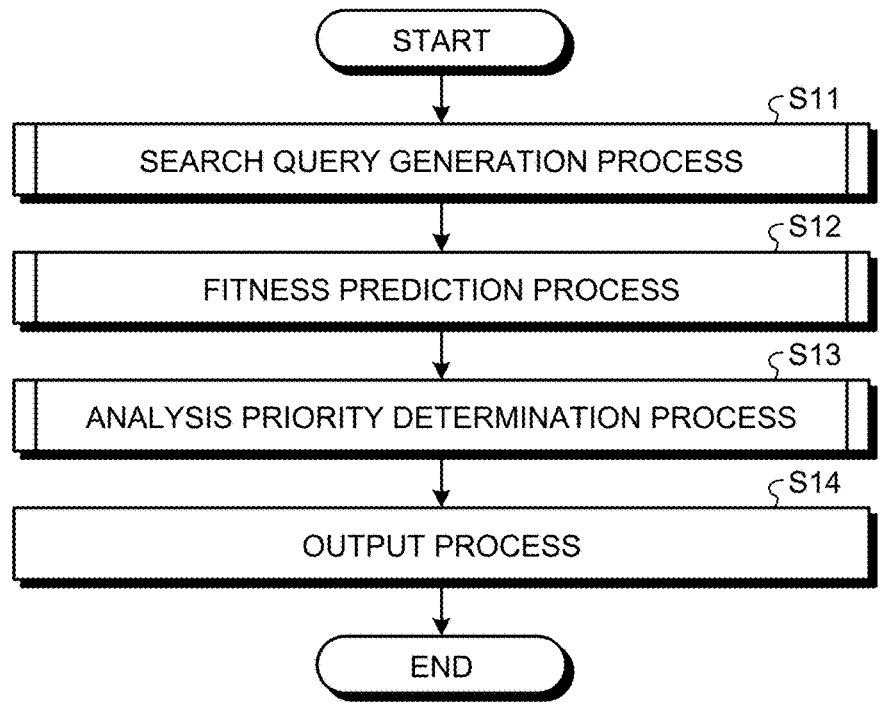
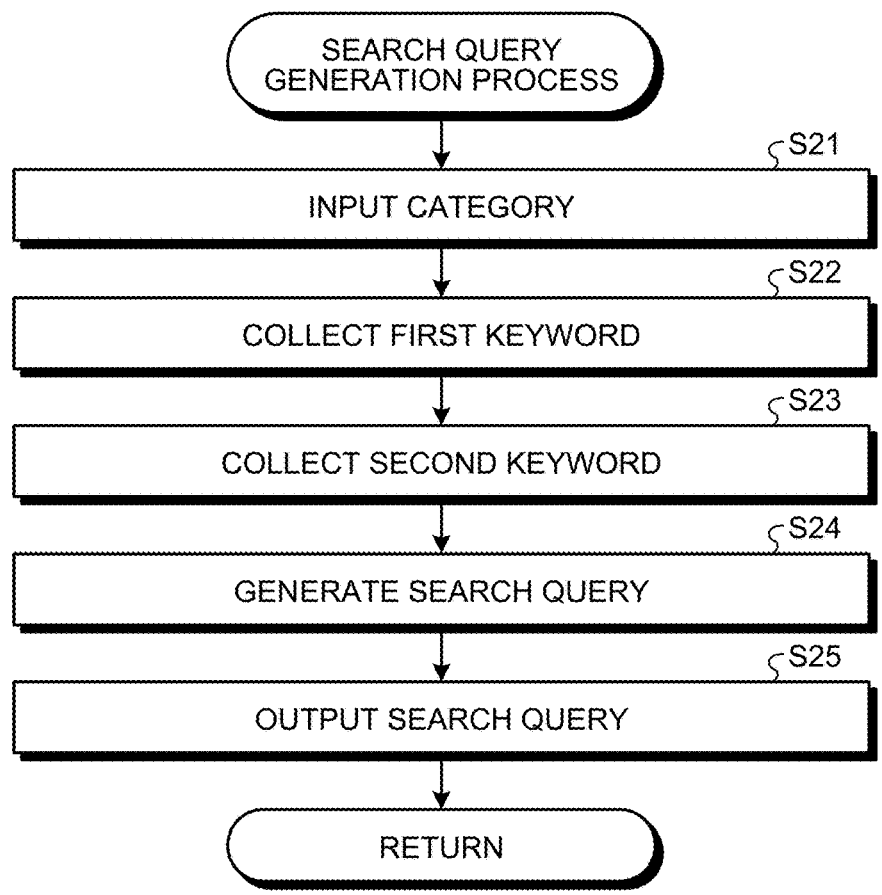

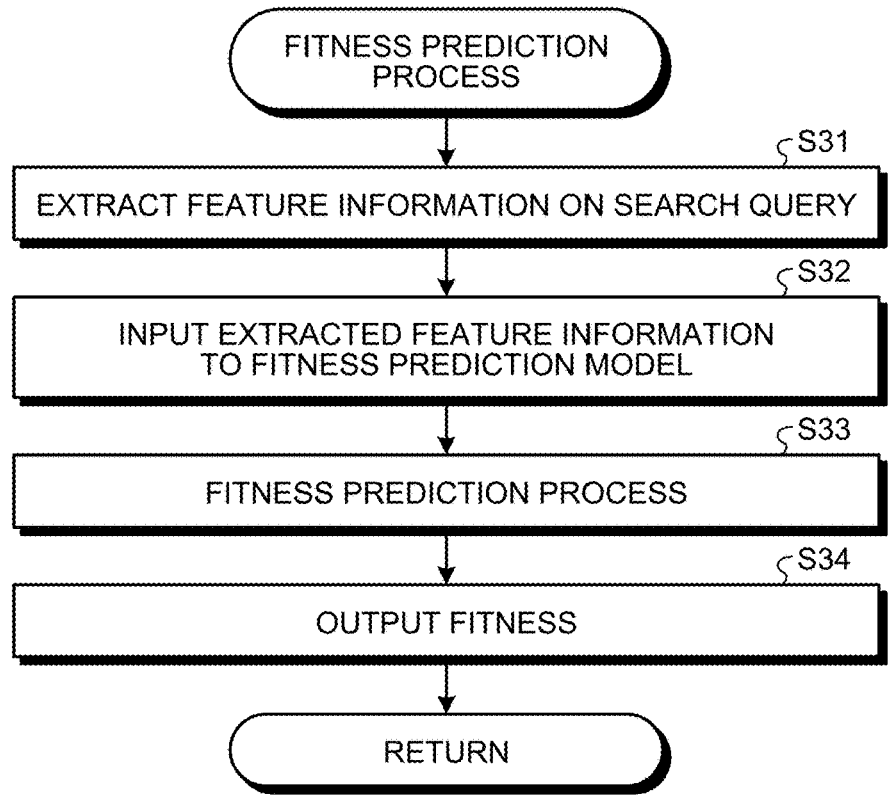
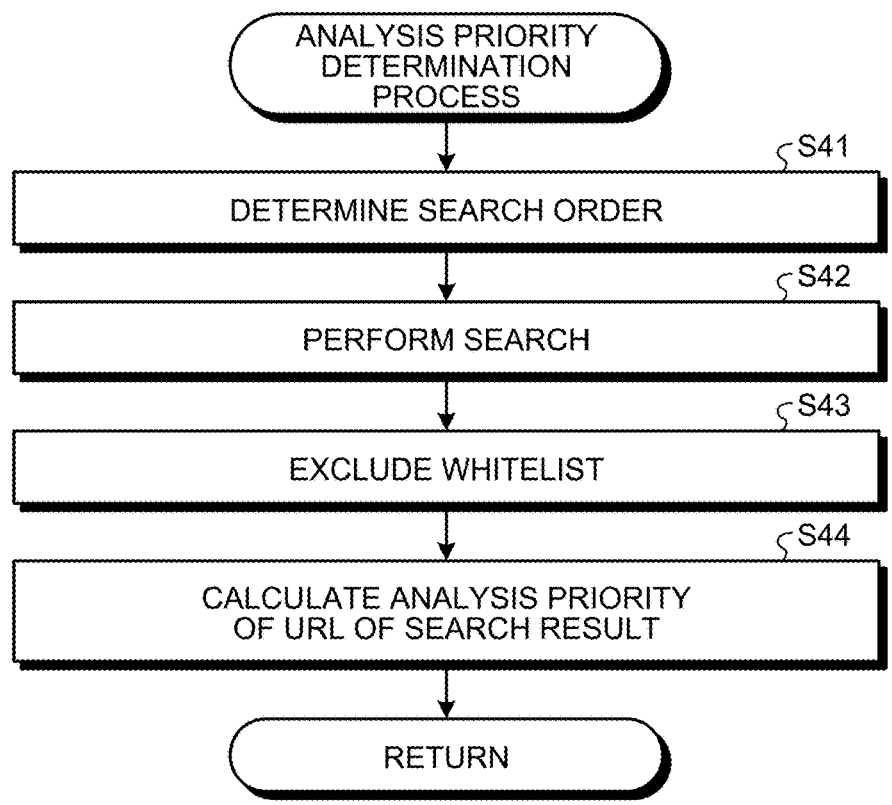

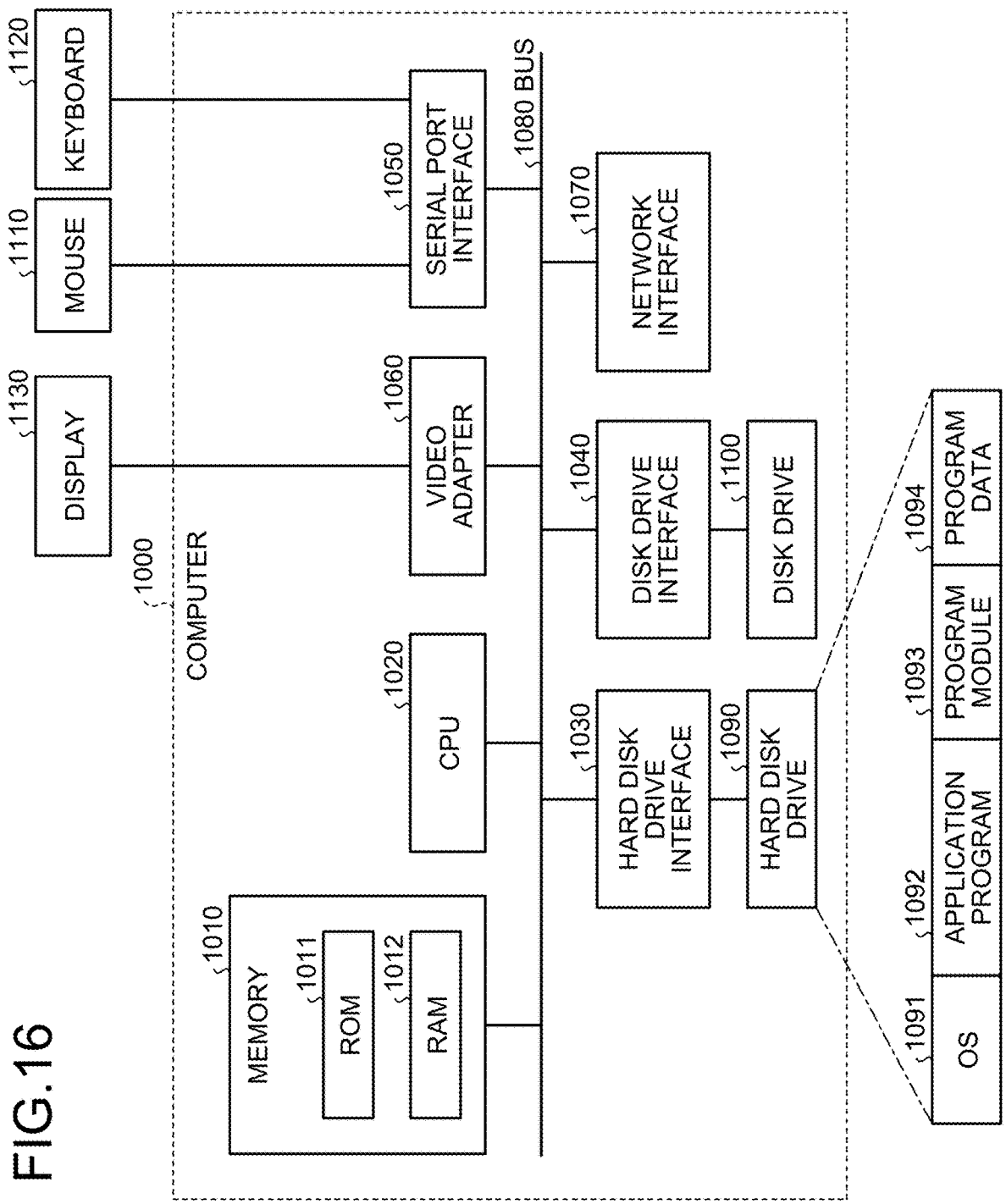

COLLECTION APPARATUS, COLLECTION METHOD, AND COLLECTION PROGRAM

CROSS-REFERENCE TO RELATED APPLICATIONS

The present application is based on PCT filing PCT/JP2018/034625, filed Sep. 19, 2018, which claims priority to JP 2018-005694, filed Jan. 17, 2018, the entire contents of each are incorporated herein by reference.

FIELD

The present invention relates to a collection apparatus, a collection method, and a collection program.

BACKGROUND

Infection by malware that is a collective term of malicious software is often caused by Web page browsing by a user. A Drive-By Download (DBD) attack is used when the malware hacks into the user. The DBD attack is an attack that automatically transfers a user who has connected to a Web page to an attack page and infects the user with malware by using a Web browser. The DBD attack exploits a vulnerability of the Web browser or a plug-in introduced in the Web browser to infect the user with malware.

To analyze a Web page that may cause the DBD attack to occur, a method of using a Web client honey pot that is a decoy system having a vulnerability is known. In this method, a Web page is analyzed by using the Web client honey pot, and if it is determined that the Web page is malicious and may cause the DBD attack to occur, communication destination information represented by a Uniform Resource Locator (URL), a domain name, and an Internet Protocol (IP) address of the Web page is set as a blacklist. Then, each of security apparatuses blocks Web access to the blacklist, to thereby prevent a user from being infected with malware.

CITATION LIST

Non Patent Literature

Non Patent Literature 1: L. Invernizzi, P. M. Comparetti, S. Benvenuti, C. Kruegel, M. Cova, and G. Vigna, "EVIL-SEED: A Guided Approach to Finding Malicious Web Pages", IEEE S&P., pp. 428-442, 2012.
Non Patent Literature 2: T. Nelms, R. Perdisci, M. Antonakakis, and M. Ahamad, "Towards Measuring and Mitigating Social Engineering Software Download Attacks", USENIX Security Symposium, pp. 773-789, 2016.

SUMMARY

Technical Problem

To generate the blacklist indicating the communication destination information on a malicious Web page, it is necessary to analyze a Web page and analyze occurrence or non-occurrence of an attack via the Web page. Most of an analysis time of the Web page is a processing time and a data transfer time of a distribution source server. In other words, in the analysis of the Web page, a long processing time and a long data transfer time are needed in the distribution source server, so that it is difficult to increase a speed of the analysis of the Web page and reduction in the analysis time is limited.

Further, more than billion Web pages are present in a Web space, and the number of Web pages is increasing day by day; therefore, it is difficult to sequentially analyze all of the Web pages and generate a blacklist during a period in which the Web pages are valid.

Therefore, it is necessary to preferentially collect Web pages that are highly likely to be malicious, and use the Web pages as input of the analysis.

Most of Web pages in which a DBD attack occurs are normal Web pages that are manipulated by an attacker. Conventionally, to effectively collect Web pages in which the DBD attack occurs, a method of collection by a search engine using a feature of a vulnerability that is used to manipulate the Web pages, a method of collecting domain names of the Web pages from domain name registration information on the basis of a feature that a domain name is thrown away in a short period, and the like have been proposed.

In contrast, in recent years, an "attack that leads to user operation", which is different from an attack that abuses a vulnerability of a system like the DBD attack is increasing. The "attack that leads to user operation" is an attack that exploits a user's psychological blind spot by attracting the interest of a user, giving a warning, or deceiving the user, to thereby lead the user him/herself to install malware.

As a specific attack method for the "attack that leads to user operation", for example, there is a case in which a button that pretends as if a popular digital content (video, music, software, or the like) is unofficially available for free may be displayed. Then, by causing a user to click this button, a Web page on a terminal screen may be changed to a different Web page, or malware or a malicious browser extension function may be downloaded to a terminal.

As for a Web page in which the "attack that leads to user operation" occurs, it is often the case that a Web page prepared by an attacker or advertising, instead of a manipulated normal Web page, serves as a starting point. Therefore, in the method of performing a search by a search engine using a feature of a Web page that has a vulnerability, it is difficult to effectively collect a URL of a Web page in which the attack occurs. Further, in the Web page in which the "attack that leads to user operation" occurs, a domain name of the Web page tends to be used for a long time. Therefore, in the method of extracting a domain name on the basis of the feature that the domain name is thrown away in a short period, it is difficult to extract the domain name of the Web page that serves as a starting point of the attack.

In this manner, the conventional technique used to collect a URL in which the DBD attack occurs is far from effective for the "attack that leads to user operation". Further, a method of capturing a feature of the "attack that leads to user operation" and effectively collect a URL has not been proposed.

The present invention has been conceived in view of the foregoing situation, and an object is to provide a collection apparatus, a collection method, and a collection program that effectively collect a URL of a Web page that leads user operation to malware infection.

Solution to Problem

A collection apparatus that collects a Uniform Resource Locater of a Web page, the collection apparatus includes: a search query generation unit configured to generate a search query for a search engine by combining a digital content name that is a name of a digital content and an associated keyword of the digital content; a degree prediction unit configured to predict a degree to which a Web page that leads to user operation is output as a search result when a search is performed by using the generated search query, on the basis of feature information on the search query generated by the search query generation unit;

a determination unit configured to search for a Web page by using a search query in a search order that is based on the degree predicted by the degree prediction unit, and determine analysis priority that is priority for analyzing whether a URL of a retrieved Web page is the Web page that leads to user operation on the basis of the degree of the search query and search result information; and an output unit configured to output the URL of the Web page retrieved by the determination unit and the analysis priority of the URL in an associated manner to the output unit.

Advantageous Effects of Invention

According to the present invention, it is possible to effectively collect a URL of a Web page that leads user operation to malware infection.

BRIEF DESCRIPTION OF DRAWINGS

FIG. 3 is a diagram illustrating an example of a data structure of category data that is stored in a category database (DB) illustrated in FIG. 2.

FIG. 4 is a diagram illustrating an example of data that is stored in a known search query DB illustrated in FIG. 2.

FIG. 5 is a diagram illustrating an example of a data structure of a whitelist.

FIG. 6 is a diagram illustrating first keywords and additional information that are collected by a first keyword collection unit illustrated in FIG. 2.

FIG. 7 is a diagram illustrating an example of second keywords that are collected by a second keyword collection unit illustrated in FIG. 2.

FIG. 8 is a diagram illustrating an example of search queries that are generated by a generation unit illustrated in FIG. 2.

FIG. 9 is a diagram illustrating an example of feature information on the search queries that are extracted by a feature information extraction unit illustrated in FIG. 2.

FIG. 12 is a flowchart illustrating the flow of a Web page collection process that is performed by the collection apparatus illustrated in FIG. 2.

FIG. 13 is a flowchart illustrating the flow of a search query generation process illustrated in FIG. 12.

FIG. 14 is a flowchart illustrating the flow of a fitness prediction process illustrated in FIG. 12.

FIG. 15 is a flowchart illustrating the flow of an analysis priority determination process illustrated in FIG. 12.

FIG. 16 is a diagram illustrating an example of a computer that implements the collection apparatus by executing a program.

DESCRIPTION OF EMBODIMENTS

One embodiment of the present invention will be described in detail below with reference to the drawings. The present invention is not limited to the embodiment below. Further, in the description of the drawings, the same components are denoted by the same reference symbols.

Embodiment

Figure 1:
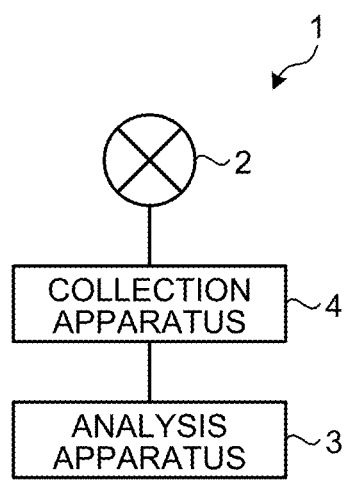
FIG. 1 is a diagram illustrating an example of a configuration of an analysis system according to an embodiment.

An embodiment of the present invention will be described. FIG. 1 is a diagram illustrating an example of an analysis system according to the embodiment.

As illustrated in FIG. 1, an analysis system 1 according to the embodiment includes an analysis apparatus 3 and a collection apparatus 4 that is arranged between a network 2 and the analysis apparatus 3. The collection apparatus 4 is connected to an external apparatus (not illustrated) via the network 2.

The collection apparatus 4 collects URLs of Web pages that lead to user operation. The collection apparatus 4 preferentially collects a URL of a Web page that is highly likely to be a Web page in which an "attack that leads to user operation" occurs among the Web pages that are collected via the network 2, and outputs the collected Web page to the analysis apparatus 3. Meanwhile, the "attack that leads to user operation" is an attack that exploits a user's psychological blind spot by attracting the interest of a user, giving a warning, or deceiving the user, to thereby lead the user him/herself to install malware.

The analysis apparatus 3 performs analysis by adopting, as input, the Web page that is highly likely to be the Web page in which the "attack that leads to user operation" occurs and that is output by the collection apparatus 4, and analyzes occurrence or non-occurrence of the attack. Then, the analysis apparatus 3 generates a blacklist based on an analysis result. Then, each of security apparatuses (not illustrated) blocks Web access to the blacklist, to thereby prevent the user from being infected with malware.

Here, with regard to the "attack that leads to user operation", how much user operation leading to the attack is generated is important for an attacker. From this perspective, it is conceivable that leading by displaying a download button of digital data may be widely performed. In particular, a popular digital content for which ranking information (a purchase ranking, a recommendation ranking, or the like) provided in a Web page indicates high-ranking is expected to cause a download button to be clicked a number of times, and therefore may be frequently used for the "attack that leads to user operation". By focusing on this point, the collection apparatus 4 preferentially collects a URL of a Web page that is highly likely to be the Web page in which the "attack that leads to user operation" occurs.

Specifically, the collection apparatus 4 extracts a URL by using a search query that is generated by combining a digital content name and an associated keyword. Then, the collection apparatus 4 predicts a degree (fitness) to which the "attack that leads to user operation" is included in a search result that is obtained using the search query, on the basis of feature information on a newly-extracted search query and a known search query (including ranking information on a digital content). Subsequently, the collection apparatus 4 determines analysis priority of the extracted URL by using the predicted fitness, and outputs the extracted URL and the analysis priority of the URL in an associated manner to the analysis apparatus 3.

[Configuration of Collection Apparatus]

Figure 2:
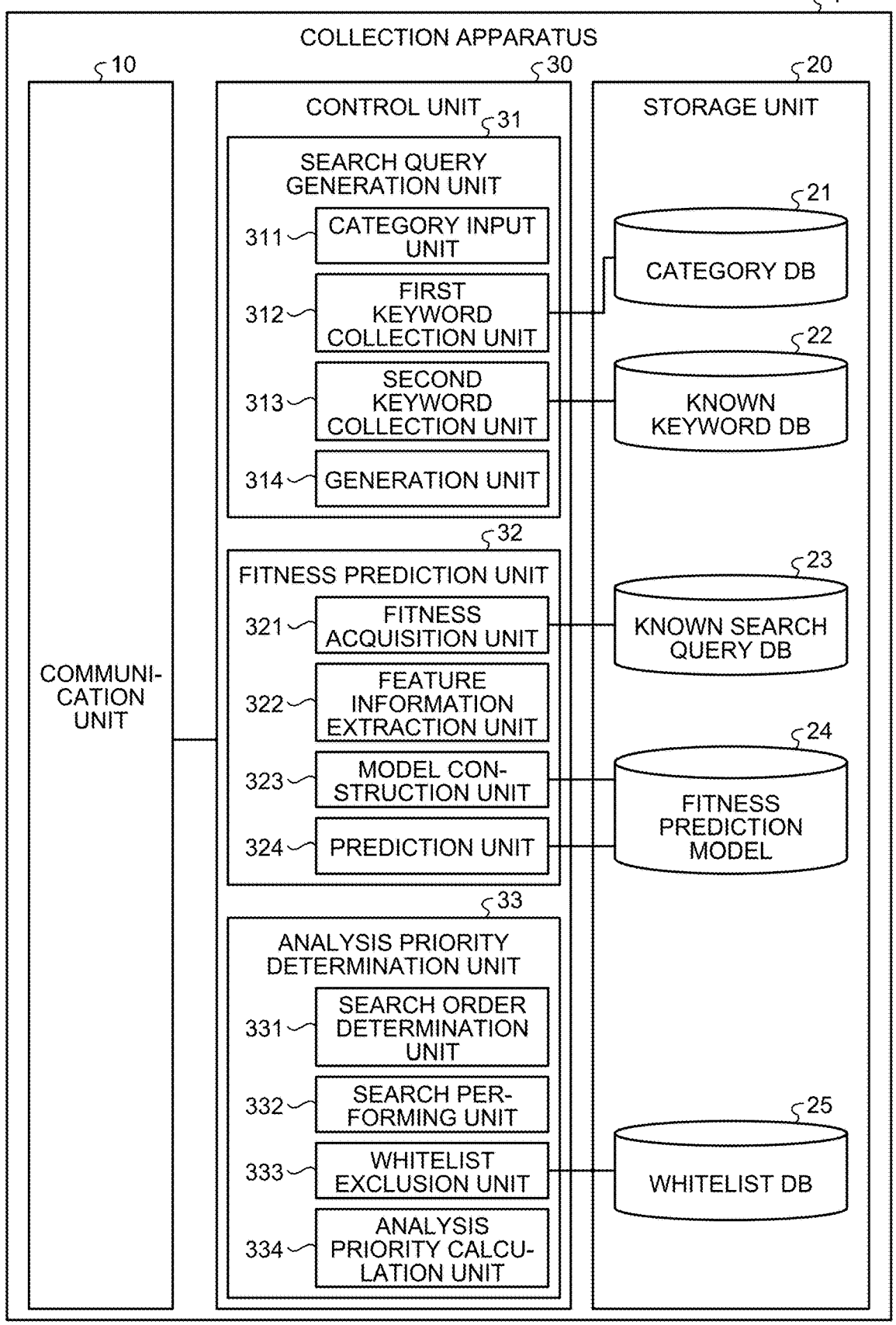
FIG. 2 is a diagram illustrating an example of a configuration of a collection apparatus illustrated in FIG. 1.

A configuration of the collection apparatus 4 will be described below. FIG. 2 is a diagram illustrating an example of the configuration of the collection apparatus 4 illustrated in FIG. 1. As illustrated in FIG. 2, the collection apparatus 4 includes a communication unit 10, a storage unit 20, and a control unit 30. Further, the collection apparatus 4 includes an input interface (not illustrated) that receives various kinds of operation from an operator, and an output apparatus (not illustrated) that is implemented by a display apparatus, a printing apparatus, an information communication apparatus, or the like.

The communication unit 10 is a communication interface that transmits and receives various kinds of information to and from other apparatuses that are connected via the network 2 or the like. The communication unit 10 is implemented by a Network Interface Card (NIC) or the like, and performs communication between the other apparatuses and the control unit 30 (to be described later) via a telecommunication line, such as a Local Area Network (LAN) or the Internet. For example, the communication unit 10 collects Web pages via the network 2. Further, the communication unit 10 outputs a URL of a Web page, which is extracted by the control unit 30 and which is highly likely to be the Web page in which the "attack that leads to user operation" occurs, and analysis priority of the URL to the analysis apparatus 3 in an associated manner.

The storage unit 20 is a storage device, such as a Hard Disk Drive (HDD), a Solid State Drive (SSD), or an optical disk. Meanwhile, the storage unit 20 may be a data rewritable semiconductor memory, such as a Random Access Memory (RAM), a flash memory, or a Non Volatile Static Random Access Memory (NVSRAM). The storage unit 20 stores therein an Operating System (OS) and various programs that are executed by the collection apparatus 4. Further, the storage unit 20 stores therein various kinds of information that are used in execution of the program. The storage unit 20 includes a category DB 21, a known keyword DB 22, a known search query DB 23, a fitness prediction model 24 (prediction model), and a whitelist DB 25.

The category DB 21 stores therein categories of digital data, input of which is received by a category input unit 311 (to be described later), and category data indicating a collection destination Web page corresponding to each of the categories.

FIG. 3 is a diagram illustrating an example of a data structure of the category data that is stored in the category DB 21 illustrated in FIG. 2. As illustrated in FIG. 3, as the category data, a digital data category and a collection destination Web page corresponding to each of the categories are associated, and a serial number is assigned to each piece of data. A first keyword collection unit 312 (to be described later) refers to the category DB 21, patrols the collection destination Web page corresponding to a category of input digital data, and collects a first keyword.

Here, each of the categories illustrated in FIG. 3 is a category of digital data that is expected to be input to the category input unit 311. Specifically, as illustrated in FIG. 3, the category of the digital data that is expected to be input to the category input unit 311 may be "Movie", "Game", "Software", "Book", "Music", and the like. The category is not limited to this example.

Further, the collection destination Web page corresponding to each of the categories is a Web page in which a content name of the digital data is provided. The collection destination Web page is set for each of the categories in advance and stored in the category DB 21. Meanwhile, the content name of the digital data provided in the Web page is collected, by the first keyword collection unit 312, as a first keyword that is an arbitrary digital content name that belongs to the category of the digital data. For example, the content name of the digital data may be a trade name of personal computer (PC) software, a trade name of a movie or a book, a name of a posted video, or the like. The content name is not limited to this example.

For example, a category of "Movie" with a serial number "1" is associated with a URL of "http://movie1.example.com" of a Web page in which a name "Movie1" of a movie is provided as the content name. Further, a category of "Game" with a serial number "2" is associated with a URL of "http://game1.example.org" of a Web page in which a name "Game1" of a game is provided as the content name.

The known keyword DB 22 stores therein a known second keyword that is obtained in advance for each of the categories. A second keyword is an associated keyword that is associated with the first keyword when the first keyword is included in a search query for a search engine. Then, a character string by which a number of Web pages that lead to user operation are output among the second keywords is obtained in advance as the known second keyword, and stored in the known keyword DB 22. For example, the known keyword DB 22 stores therein "free" as the known second keyword for the category of "Movie". Further, the known keyword DB 22 stores therein "download" as the known second keyword for the category of "Game".

The known search query DB 23 stores therein a search query for which a search result is known and the fitness of the search query in an associated manner. The search query for which the search result is known and the fitness of the search query are obtained in advance. As described above, the fitness of the search query is the degree to which the "attack that leads to user operation" is included in the search result based on the search query. In other words, the fitness is an index indicating fitness for a purpose of outputting, as the search result, a Web site that leads to user operation.

Further, the search query for which the search result is known is a known search query (malicious search query) for which a Web page that leads to user operation is included in a search result, and a known search query (benign search query) for which a Web page that leads to user operation is not included in a search result.

FIG. 4 is a diagram illustrating an example of data that is stored in the known search query DB 23 illustrated in FIG. 2. As illustrated in FIG. 4, the known search query DB 23 stores therein a search query for which a search result is known and fitness of the search query. Here, if a search result includes even a single Web page that leads to user operation, a corresponding search query is handled as a malicious search query. In the example illustrated in FIG. 4, a search query of "MovieA online" with a serial number "101" for which fitness is "0" is a benign search query. Other search queries for which fitness are larger than zero is malicious queries.

The fitness of the search query for which the search result is known is obtained in advance and stored in the known search query DB 23 in association with each of search queries. The fitness is obtained by using Expression (1), for example.

[Expression 1]

$$\text{FITNESS } p = \frac{|M \cap A|}{|A|} \quad (1)$$

A: SET OF SEARCH RESULTS OUTPUT BY SEARCH ENGINE
M: SET OF WEB PAGES THAT LEAD TO USER OPERATION

For example, a case will be described as an example in which the number of output results as search results is 10 and the number of Web pages that lead to user operation is 7 with respect to a search query of "MovieA free download". In this case, by applying the numbers as described above to Expression (1), fitness of "0.7" is obtained for the search query of "MovieA free download". Meanwhile, the fitness need not always be calculated by using Expression (1), but may be calculated using other arithmetic expressions. Further, the known search query DB 23 may store therein a set of known search queries and output results as search results and a set of Web pages that lead to user operation, in an associated manner.

The fitness prediction model 24 is a model, that, when feature information on a search query is input, outputs fitness corresponding to the input feature information. The fitness prediction model 24 includes various parameters of a model that learns a feature of the fitness of the known search query and a feature of the feature information on the known search query, on the basis of fitness of a known malicious search query and feature information on the known malicious search query and on the basis of fitness of a known benign search query and feature information on the known benign search query. Various parameters of the fitness prediction model 24 are optimized by a model construction unit 323 (to be described later) before a Web page collection process.

The whitelist DB 25 stores therein a whitelist in which a Web page group that is excluded from an analysis target of the analysis apparatus 3 is set in advance for each of the categories. FIG. 5 is a diagram illustrating an example of a data structure of the whitelist.

As illustrated in FIG. 5, the whitelist has a data structure in which communication destination information, such as a domain name or a URL, and the category is associated with each other, and a serial number is assigned to each piece of data. In the whitelist, a Web page group that is excluded from the analysis target of the analysis apparatus 3 is set in advance for each of the categories. Meanwhile, in FIG. 5, a domain name or a URL of a Web page is illustrated as a type of a communication destination that is set as the whitelist, but the type is not limited to items as described above. The whitelist is referred to by a whitelist exclusion unit 333 (to be described later).

The control unit 30 controls the entire collection apparatus 4. The control unit 30 is, for example, an electronic circuit, such as a Central Processing Unit (CPU) or a Micro Processing Unit (MPU), or an integrated circuit, such as an Application Specific Integrated Circuit (ASIC) or a Field Programmable Gate Array (FPGA). Further, the control unit 30 includes an internal memory for storing a program that defines various processing procedures and control data, and performs various processes by using the internal memory. Furthermore, the control unit 30 functions as various kinds of processing units by executing various programs. The control unit 30 includes a search query generation unit 31, a fitness prediction unit 32 (degree prediction unit), and an analysis priority determination unit 33 (determination unit).

The search query generation unit 31 generates a search query for a search engine by combining a digital content name that is a name of a digital content and an associated keyword of the digital content.

The fitness prediction unit 32 predicts fitness of the search query on the basis of feature information on the search query that is generated by the search query generation unit 31. The fitness is a degree to which a Web page that leads to user operation is output as a search result when a search is performed using the generated search query.

The analysis priority determination unit 33 searches for a Web page by using the search query in a search order that is based on the fitness predicted by the fitness prediction unit 32. Then, the analysis priority determination unit 33 determines analysis priority of a URL of the retrieved Web page, on the basis of the fitness of the search query and search result information. The analysis priority is priority that is adopted when analysis on whether a Web page is the Web page that leads to user operation is performed. Meanwhile, the communication unit 10 outputs the URL of the Web page retrieved by the analysis priority determination unit 33 and the analysis priority of the URL to the analysis apparatus 3 in an associated manner.

[Search Query Generation Unit]

A configuration of the search query generation unit will be described below. The search query generation unit 31 includes the category input unit 311, the first keyword collection unit 312, a second keyword collection unit 313, and a generation unit 314.

The category input unit 311 receives input of a category of digital data. The category input unit 311 accepts, as input, a category for collecting the first keyword. The first keyword is an arbitrary digital content name that belongs to the category.

The first keyword collection unit 312 collects, as the first keyword, an arbitrary digital content name that belongs to the category from a Web site that is set as a collection destination in advance. The first keyword collection unit 312 selects a Web page for each of categories of digital data input from the category input unit 311. The first keyword collection unit 312 refers to the category DB 21 and selects a collection destination Web page corresponding to the input category. The first keyword collection unit 312 accesses the selected Web page and extracts, as the first keyword, a digital content name indicating a product and distribution data, to thereby collect the first keyword. The first keyword collection unit 312 also collects additional information on the first keyword, together with the first keyword.

FIG. 6 is a diagram illustrating the first keyword and the additional information that are collected by the first keyword collection unit 312 illustrated in FIG. 2. If the category is input to the category input unit 311, the first keyword collection unit 312 performs Web access to the collection destination Web page that is set for each of the categories illustrated in FIG. 6. Then, as illustrated in FIG. 3, the first keyword collection unit 312 collects, as the first keyword, an arbitrary digital content from each of Web pages on which the Web access has been performed.

Further, the first keyword collection unit 312 extracts the additional information together with the first keyword. As illustrated in FIG. 6. the additional information is the category associated with the first keyword, the collection destination Web page, and ranking information. The ranking information is a purchase ranking, a recommendation ranking, a ranking by video posted date/time, a popularity ranking based on user evaluation, or the like. The additional information is not limited to items as described above.

Specifically, if the input category is "Movie", the first keyword collection unit 312 accesses a URL of "http://movie1.example.com" corresponding to the category of "Movie" (see FIG. 3). In this case, if a movie name of "MovieA" is provided in the Web page, the first keyword collection unit 312 collects "MovieA" as the first keyword (see FIG. 3). Further, the first keyword collection unit 312 extracts additional information included in the Web page. For example, the first keyword collection unit 312 extracts, as the additional information, the category of "Movie", the collection destination Web page of "http://movie1.example.com", and ranking information of "1" that are associated with the first keyword "MovieA" from the Web page. The additional information may be used to calculate the analysis priority in some cases.

The first keyword collection unit 312 performs processes, as a Web page patrol process and a character string extraction process for collecting the first keyword and the additional information from each of the Web pages, by using a browser operation automation tool or a Web browser by which browser operation can be written using a programming language, for example. The first keyword collection unit 312 may be able to use other methods. Further, processing procedures of Web page patrol and character string extraction performed by the first keyword collection unit 312 are set in advance for each of the Web pages.

The second keyword collection unit 313 collects the second keyword. The second keyword is an associated keyword that is associated with the first keyword when the first keyword is included in a search query for a search engine. In other words, the second keyword is a character string that is frequently added, as a search query for a search engine, to the first keyword.

The second keyword collection unit 313 collects a new second keyword by using the first keyword that is collected by the first keyword collection unit 312. Specifically, the second keyword collection unit 313 extracts a character string including the first keyword by using a search suggest function and a related search function of the search engine, and extracts, as the second keyword, a character string other than the first keyword in the extracted character string.

Meanwhile, some second keywords are obtained in advance for each of the categories and stored, as known second keywords, in the known keyword DB 22. The known second keyword is a character string by which a number of Web pages that lead to user operation are output when a search is performed by adding the known second keyword to an arbitrary first keyword.

FIG. 7 is a diagram illustrating an example of the second keyword that is collected by the second keyword collection unit 313 illustrated in FIG. 2. The second keyword collection unit 313 collects the second keyword by using the first keyword that is collected by the first keyword collection unit 312. As described above, the second keyword is a character string that is frequently added, as a search query for a search engine, to the first keyword.

The second keyword collection unit 313 extracts the second keyword by the search suggest function and the related search function of the search engine, by using the known second keyword by which a number of Web pages that lead to user operation are output when a search is performed by adding the known second keyword to the first keyword. The second keyword collection unit 313 refers to the known keyword DB 22 and acquires the known second keyword.

For example, as indicated by a serial number "1" in FIG. 7, the second keyword collection unit 313 constructs a character string of "MovieA free" by adding a known second keyword of "free" to a first keyword of "MovieA" that belongs to the category of "Movie".

Subsequently, the second keyword collection unit 313 inputs the character string of "MovieA free" to the search suggest function, and obtains a character string of "MovieA free download" that is output from the search suggest function. The second keyword collection unit 313 extracts a character string of "download" that is newly obtained from the output character string of "MovieA free download", as a second keyword that belongs to the category of "Movie". Meanwhile, the second keyword is not limited to those as illustrated in FIG. 7, and different methods may be adopted as an extraction method.

The generation unit 314 generates a search query by combining the first keyword and the second keyword. The generation unit 314 generates the search query by combining the first keyword collected by the first keyword collection unit 312 and the second keyword collected by the second keyword collection unit 313. The generation unit 314 outputs the generated search query to the fitness prediction unit 32.

FIG. 8 is a diagram illustrating an example of the search query that is generated by the generation unit 314 illustrated in FIG. 2. The generation unit 314 constructs the search query by connecting the first keyword and the known second keyword that belongs to the same category as the first keyword. Alternatively, the generation unit 314 constructs the search query by connecting the first keyword and the second keyword that is collected by using the first keyword.

For example, the generation unit 314 generates a search query of "MovieA free" by connecting the first keyword of "MovieA" and the known second keyword of "free" that belongs to the same category of "Movie" as that of the first keyword of "MovieA" (see a serial number "1" in FIG. 8). Further, the generation unit 314 generates a search query of "MovieA free download" by connecting the first keyword of "MovieA", the known second keyword of "free" that belongs to the same category of "Movie" as that of the first keyword of "MovieA", and the second keyword of "download" that is collected by the second keyword collection unit 313 (see a serial number "2" in FIG. 8).

The generation unit 314 may construct the search query by connecting the first keyword and one of a known second keyword that belongs to a different category from that of the first keyword and a collected second keyword. Meanwhile, combinations of the first keyword and the second keyword are not limited to those as illustrated in FIG. 8.

[Fitness Prediction Unit]

A configuration of the fitness prediction unit 32 will be described below. The fitness prediction unit 32 includes a fitness acquisition unit 321, a feature information extraction unit 322, the model construction unit 323, and a prediction unit 324.

The fitness acquisition unit 321 acquires fitness of a search query for which a search result is known. The fitness acquisition unit 321 acquires the fitness of the search query for which the search result is known by referring to the known search query DB 23. Further, if the known search query DB 23 stores therein a set of known search queries and output results as search results and a set of Web pages that lead to user operation in an associated manner, the fitness acquisition unit 321 acquires, from the known search query DB 23, data of a search query for which the fitness is to be acquired, calculates the fitness by using Expression (1), and acquires the fitness. The fitness acquisition unit 321 need not always calculate the fitness by using Expression (1), but may use other arithmetic expressions.

The feature information extraction unit 322 extracts feature information on a search query. The feature information extraction unit 322 extracts feature information on a search query for which a search result is known. Further, feature information on the search query generated by the search query generation unit 31 is extracted. The feature information on the search query may be, for example, a category to which a character string included in the search query belongs, the number of words or characters of the entire search query, or the like.

FIG. 9 is a diagram illustrating an example of the feature information on the search query that is extracted by the feature information extraction unit 322 illustrated in FIG. 2. The feature information on the search query may be, for example, as illustrated in each of items in FIG. 9, a ranking as the additional information on the first keyword that is used by the search query generation unit 31 for generating the search query, a category, the number of second keywords (second keyword number), a Bag of Words model, the number of words or characters of the entire search query. The feature information on the search query is not limited to items as illustrated in FIG. 9.

A case will be described in which the feature information extraction unit 322 extracts feature information from, for example, the search query of "MovieA free" among search queries that are generated by the search query generation unit 31. In this case, because "free" appears once in the search query of "MovieA free", the feature information extraction unit 322 extracts "1" as the feature information corresponding to a "free" field of the Bag of Words model. Subsequently, because the known second keyword of "free" is present in the search query of "MovieA free", the feature information extraction unit 322 extracts "1" as the feature information corresponding to the second keyword number. The feature information extraction unit 322 extracts "2" as the number of words of the search query "MovieA free" and "1" as the number of characters. Further, the feature information extraction unit 322 extracts a ranking of "1" from the additional information on the first keyword of "MovieA" in the search query of "MovieA free", and extracts "Movie" as the category.

The model construction unit 323 causes the fitness prediction model 24 to learn the feature information and the fitness of the search query for which the search result is known. The fitness of the search query for which the search result is known is the fitness that is acquired by the fitness acquisition unit 321. The feature information on the search query for which the search result is known is the feature information that is extracted by the feature information extraction unit 322 from the search query for which the search result is known. Meanwhile, the fitness prediction model 24 is stored in the storage unit 20.

The model construction unit 323 adopts, for example, a supervised machine learning method, and causes the fitness prediction model 24 to perform learning by using, as teacher data, the feature information and the fitness of the search query for which the search result is known. Meanwhile, as an applicable supervised machine learning method, a support vector machine or a random forest may be applied, but methods are not limited thereto.

The prediction unit 324 predicts the fitness of the search query generated by the search query generation unit 31, by using the feature information on the search query generated by the search query generation unit 31. The prediction unit 324 inputs the feature information on the search query generated by the search query generation unit 31 to the fitness prediction model 24, and acquires the fitness of the search query output by the fitness prediction model 24.

[Analysis Priority Determination Unit]

A configuration of the analysis priority determination unit 33 will be described below. The analysis priority determination unit 33 includes a search order determination unit 331, a search performing unit 332, the whitelist exclusion unit 333, and an analysis priority calculation unit 334.

The search order determination unit 331 determines a search order of the search query generated by a search query generation unit 11, on the basis of the fitness predicted by the fitness prediction unit 32. The search order determination unit 331 determines a search query, which is to be used for a search performed by the search performing unit 332 among search queries generated by the search query generation unit 11, and a search order of the search query by using the fitness predicted by the fitness prediction unit 32. For example, the search order determination unit 331 extracts search queries, for each of which a pre-set threshold for the fitness is exceeded, from among the search queries generated by the search query generation unit 11, and determines a search order such that the extracted search queries are searched for in order from the highest to the lowest fitness.

The search performing unit 332 performs a search on Web pages using the search queries in the search order determined by the search order determination unit 331. Then, the search performing unit 332 extracts URLs of Web pages as search results based on the search queries.

The whitelist exclusion unit 333 excludes a URL that is obtained in advance for each of the categories and that corresponds to a Web page eliminated from the analysis target of the analysis apparatus 3, from URLs of Web pages that are retrieved by the search performing unit 332. The URL eliminated from the analysis target is indicated in advance in the whitelist that is stored in the whitelist DB 25. The whitelist exclusion unit 333 refers to the whitelist in the whitelist DB 25, and excludes, from the URLs of the Web pages that are retrieved by the search performing unit 332, the URLs of the Web pages that are eliminated from the analysis target.

The analysis priority calculation unit 334 calculates analysis priority of a URL remaining after exclusion performed by the whitelist exclusion unit 333, on the basis of the fitness of the search query, the search order of the search query, and the search result information. The URL remaining after the exclusion and the analysis priority of the URL are output from the communication unit 10 to the analysis apparatus 3. For example, the communication unit 10 outputs URLs in the order from the highest to the lowest analysis priority. The analysis apparatus 3 uses the analysis priority of the URL as an index for preferentially analyzing a Web page that leads to user operation, to thereby improve efficiency of analysis.

An analysis priority calculation method will be described in detail below. The analysis priority calculation unit 334 calculates the analysis priority of the URL remaining after the exclusion, by applying a set of output results of a search engine, a search order of the search query at the time of searching for the URL, and the fitness of the search query at the time of searching for the URL to Expression (2). Meanwhile, the fitness of the search query is predicted by the fitness prediction unit 32. Further, the search order of the URL is determined by the search order determination unit 331 on the basis of the fitness that is predicted by the fitness prediction unit 32.

[Expression 2]

$$\text{ANALYSIS PRIORITY } p' = p - \frac{r}{|R|} \quad (2)$$

R: SET OF OUTPUT RESULTS OF SEARCH ENGINE
r: SEARCH ORDER OF URL
p: FITNESS

Figures 10, 11:
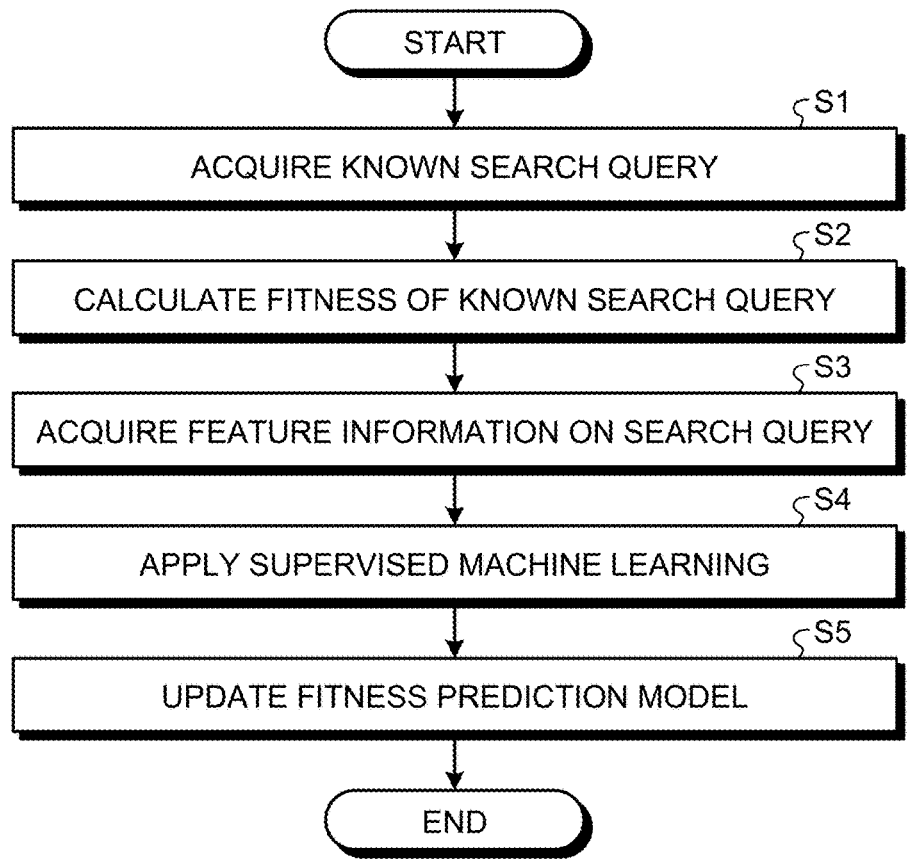
FIG. 10 is a diagram illustrating an example of analysis priority that is assigned to a URL and that is calculated by an analysis priority calculation unit illustrated in FIG. 2.
FIG. 11 is a flowchart illustrating the flow of a process of constructing a fitness prediction model illustrated in FIG. 2.

FIG. 10 is a diagram illustrating an example of the analysis priority that is assigned to the URL and that is calculated by the analysis priority calculation unit 334 illustrated in FIG. 2. FIG. 10 illustrates an example of the analysis priority of URLs that are output from the whitelist exclusion unit 333.

As illustrated in FIG. 10, the analysis priority calculation unit 334 calculates analysis priority of a URL of "http://movie.example.com/" by using Expression (2) and obtains "0.9". Further, the analysis priority calculation unit 334 calculates analysis priority of a URL of "http://game.example.com/" by using Expression (2) and obtains "0.8". The communication unit 10 outputs data in which the URLs illustrated in FIG. 10 and the analysis priority of the URLs are associated, as data indicating the collected URLs, to the analysis apparatus 3.

Meanwhile, the analysis priority calculation unit 334 need not always calculate the analysis priority by using Expression (2), but may use other methods. For example, the analysis priority calculation unit 334 may calculate the analysis priority by using a first keyword order as the additional information on the first keyword, by using Expression (3).

[Expression 3]

$$\text{ANALYSIS PRIORITY } p' = p - \frac{r}{|R|} - \frac{n}{|N|} \quad (3)$$

R: SET OF OUTPUT RESULTS OF SEARCH ENGINE
r: SEARCH ORDER OF URL
p: FITNESS
n: FIRST KEYWORD ORDER
N: SET OF FIRST KEYWORD COLLECTION RESULT

[Flow of Process of Constructing Fitness Prediction Model]

A process of constructing the fitness prediction model will be described below. FIG. 11 is a flowchart illustrating the flow of the process of constructing the fitness prediction model illustrated in FIG. 2.

First, the fitness acquisition unit 321 acquires a search query for which a search result is known, by referring to the known search query DB 23 (Step S1), and calculates fitness of the known search query (Step S2). The feature information extraction unit 322 acquires feature information on the search query, for which the search result is known and which is acquired by the fitness acquisition unit 321 (Step S3).

The model construction unit 323 applies supervised machine learning (Step S4), and causes the fitness prediction model 24 to learn the feature information and the fitness of the search query for which the search result is known. Then, the model construction unit 323 updates the fitness prediction model 24 in which various parameters are optimized by the learning (Step S5), and terminates the process of constructing the fitness prediction model. This process is performed at least before the Web page collection process. Further, this process may be performed in parallel to the Web page collection process.

[Flow of Web Page Collection Process]

A flow of the Web page collection process performed by the collection apparatus 4 will be described below. FIG. 12 is a flowchart illustrating the flow of the Web page collection process performed by the collection apparatus 4 illustrated in FIG. 2.

As illustrated in FIG. 12, in the collection apparatus 4, the search query generation unit 31 performs a search query generation process of generating a search query for a search engine, by combining a digital content name that is a name of a digital content and an associated keyword of the digital content (Step S11). Then, the fitness prediction unit 32 performs a fitness prediction process of predicting fitness of the search query, on the basis of feature information on the search query generated by the search query generation unit 31 (Step S12).

Subsequently, the analysis priority determination unit 33 performs an analysis priority determination process of determining analysis priority on the basis of the fitness of the search query and the search result information (Step S13). The communication unit 10 performs an output process of outputting a URL of the Web page that is retrieved by the analysis priority determination unit 33 and the analysis priority of the URL in an associated manner to the analysis apparatus 3 (Step S14), and terminates the process.

[Flow of Search Query Generation Process]

A flow of the search query generation process will be described below (Step S11). FIG. 13 is a flowchart illustrating the flow of the search query generation process illustrated in FIG. 12.

As illustrated in FIG. 13, in the search query generation unit 11, first, the category input unit 311 receives input of a category of digital data (Step S21). Subsequently, the first keyword collection unit 312 accesses a collection destination Web page by using a URL group that is set in advance for each of input categories as a URL of the collection destination Web page, and performs a first keyword collection process of collecting an arbitrary digital content name belonging to the category as the first keyword (Step S22). In this case, the first keyword collection unit 312 accesses the collection destination Web page, causes a Web browser to automatically operate by using software by which operation of the Web browser can be written, and extracts the first keyword and the additional information as illustrated in FIG. 3 on the basis of the Web page patrol process or the character string extraction process that are set in advance.

Then, the second keyword collection unit 313 performs a second keyword collection process of collecting the second keyword (Step S23). As described above, the second keyword is an associated keyword that is associated with the first keyword when the first keyword is included in the search query for the search engine.

Subsequently, the generation unit 314 performs the search query generation process of generating a search query by combining the first keyword and the second keyword (Step S24). The search query generation unit 31 outputs the search query generated by the generation unit 314 to the fitness prediction unit 32 (Step S25), and terminates the search query generation process.

[Flow of Fitness Prediction Process]

A flow of the fitness prediction process (Step S12) will be described below. FIG. 14 is a flowchart illustrating the flow of the fitness prediction process illustrated in FIG. 12.

As illustrated in FIG. 14, in the fitness prediction unit 32, the feature information extraction unit 322 extracts the feature information on the search query generated by the search query generation unit 31 (Step S31). The prediction unit 324 inputs the feature information on the search query extracted from the feature information extraction unit 322 to the fitness prediction model (Step S32), and performs the fitness prediction process of acquiring the fitness of the search query output by the fitness prediction model 24 (Step S33). The fitness prediction unit 32 outputs, in an associated manner, the search query and the fitness that is predicted by the prediction unit 324 with respect to the search query to the analysis priority determination unit 33 (Step S34), and terminates the process.

[Flow of Analysis Priority Determination Process]

A flow of the analysis priority determination process (Step S13) will be described below. FIG. 15 is a flowchart illustrating the flow of the analysis priority determination process illustrated in FIG. 12.

As illustrated in FIG. 15, in the analysis priority determination unit 33, the search order determination unit 331 determines a search order of the search query that is generated by the search query generation unit 31, on the basis of the fitness predicted by the fitness prediction unit 32 (Step S41). The search performing unit 332 searches for a Web page by using the search query in the search order that is determined by the search order determination unit 331 (Step S42).

Then, the whitelist exclusion unit 333 excludes URLs of Web pages that are indicated by the whitelist and that are eliminated from the analysis target, from URLs of Web pages that are retrieved by the search performing unit 332 (Step S43). Subsequently, the analysis priority calculation unit 334 calculates analysis priority of a URL remaining after the exclusion performed by the whitelist exclusion unit 333, on the basis of the fitness of the search query, the search order of the search query, and the search result information (Step S44), and terminates the process.

Effects of Embodiments

As described above, in the collection apparatus 4 according to the embodiment, a search query for a search engine is generated by combining a digital content name that is a name of a digital content and an associated keyword of the digital content. Then, in the collection apparatus 4, fitness, which is a degree to which a Web page that leads to user operation is output as a search result when a search is performed using the generated search query, is predicted on the basis of feature information on the generated search query. Then, in the collection apparatus 4, a Web page is searched for by using the search query in the search order that is based on the predicted fitness, and analysis priority that is priority for determining whether the Web page is a Web page that leads to user operation is determined for a URL of a retrieved Web page, on the basis of the fitness of the search query and the search result information. Further, in the collection apparatus 4, the URL of the retrieved Web page and the analysis priority of the URL is output in an associated manner to the analysis apparatus 3.

Therefore, according to the embodiment, a search query, by which the Web page that leads to user operation is output as the search result, is generated by combining the digital content name and the associated keyword of the digital content. Then, according to the embodiment, the fitness of the search query is predicted on the basis of the feature information on the generated search query, so that it is possible to preferentially extract the search query by which the Web page that causes user operation to be infected with malware is output as the search result. Further, according to the embodiment, by searching for a Web page by using the search query in the search order that is based on the predicted fitness, it is possible to effectively perform a search using the search query. Then, according to the embodiment, by determining the analysis priority of a Web page being a search result that is retrieved by using the preferentially-extracted search query, it is possible to, in the analysis apparatus 3, obtain an index for preferentially analyzing the URL of the Web page that causes user operation to be infected with malware, so that it is possible realize effective analysis.

As described above, according to the embodiment, it is possible to effectively collect Web pages that cause user operation to be infected with malware.

Furthermore, in the collection apparatus 4 according to the embodiment, upon receiving input of a category of digital data, the search query generation unit 31 collects, as the first keyword, an arbitrary digital content name that belongs to the category. In this case, the search query generation unit 31 selects a Web page for each of the categories of digital data, and extracts a digital content name indicating a product or distribution data as the first keyword by accessing the selected Web page. Therefore, according to the embodiment, it is possible to effectively extract the first keyword.

Then, if the first keyword is included in the search query for the search engine, the search query generation unit 31 collects, as the second keyword, an associated keyword that is associated with the first keyword. In this case, the search query generation unit 31 extracts a character string including the first keyword by using the search suggest function and the related search function of the search engine, and extracts, as the second keyword, a character string other than the first keyword from the target character string. Therefore, according to the embodiment, it is possible to effectively collect the first keyword and the second keyword that are selected, as a search query, by a user who reaches a Web page that leads to user operation.

Moreover, the search query generation unit 31 generates the search query by combining the first keyword and the second keyword. Therefore, according to the embodiment, it is possible to preferentially generate the search query by which the Web page that leads to user operation is output as the search result.

Then, in the collection apparatus 4 according to the embodiment, the fitness prediction unit 32 causes the fitness prediction model 24 to learn the feature information and the fitness of a known search query by which the Web page that leads to user operation is included in a search result and a known search query by which the Web page that leads to user operation is not included in a search result. Then, the fitness prediction unit 32 predicts the fitness of the search query by using the fitness prediction model 24, on the basis of the feature information on the search query generated by the search query generation unit 31.

Therefore, according to the embodiment, by using the fitness prediction model 24, it is possible to appropriately predict the fitness of the search query generated by the search query generation unit 31. Further, the fitness is an index for effectively selecting a search query by which the Web page that leads to user operation is output as the search result. Therefore, according to the embodiment, in the analysis priority determination unit 33 on the subsequent stage, it is possible to appropriately and effectively collect the Web page that leads to user operation.

In the collection apparatus 4 according to the embodiment, the analysis priority determination unit 33 searches for Web pages by using the search query in the search order that is based on the predicted fitness. Thereafter, the analysis priority determination unit 33 excludes URLs of Web pages that are eliminated from the analysis target of the analysis apparatus 3 and that are included in the whitelist, from URLs of the retrieved Web pages, so that a cost for analyzing the Web pages eliminated from the analysis target is reduced.

Then, the analysis priority determination unit 33 calculates the analysis priority with respect to a URL remaining after exclusion, on the basis of the fitness of the search query, the search order of the search query, and the search result information. The analysis priority is an index for effectively selecting a Web page that is highly likely to be a starting point of an attack that leads to user operation when the analysis apparatus 3 analyzes Web pages, and makes it possible to effectively perform analysis in the analysis apparatus 3.

[System Configuration, Etc.]

The components of the apparatuses illustrated in the drawings are conceptual functions, and need not be physically configured in the manner as illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions Further, all or an arbitrary part of the processing functions implemented by the apparatuses may be realized by a CPU and a program analyzed and executed by the CPU, or may be realized by hardware using wired logic.

Furthermore, of the processes described in the embodiment, all or part of a process described as being performed automatically may also be performed manually. Alternatively, all or part of a process described as being performed manually may also be performed automatically by known methods. In addition, the processing procedures, control procedures, specific names, and information including various kinds of data and parameters illustrated in the above-described document and drawings may be arbitrarily changed unless otherwise specified.

[Program]

FIG. 16 is a diagram illustrating an example of a computer that realizes the collection apparatus 4 by executing a program. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. All of the units are connected to one another via a bus 1080.

The memory 1010 includes a read only memory (ROM) 1011 and a RAM 1012. The ROM 1011 stores therein, for example, a boot program, such as Basic Input Output System (BIOS). The hard disk drive interface 1030 is connected to a hard disk drive 1090. The disk drive interface 1040 is connected to a disk drive 1100. For example, a removable storage medium, such a magnetic disk or an optical disk, is inserted in the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and program data 1094. In other words, the program that defines each of the processes performed by the collection apparatus 4 is implemented as the program module 1093 in which a computer-executable code is written. The program module 1093 is stored in, for example, the hard disk drive 1090. For example, the program module 1093 that performs the same process as the functional configuration of the collection apparatus 4 is stored in the hard disk drive 1090. Meanwhile, the hard disk drive 1090 may be replaced with an SSD.

Further, the setting data used in the processes in the embodiment as described above is stored, as the program data 1094, in the memory 1010 or the hard disk drive 1090, for example. Then, the CPU 1020 reads the program module 1093 and the program data 1094 stored in the memory 1010 or the hard disk drive 1090 onto the RAM 1012 and executes the program module 1093 and the program data 1094 if needed.

Meanwhile, the program module 1093 and the program data 1094 need not always be stored in the hard disk drive 1090, but may be stored in, for example, a removable storage medium and read by the CPU 1020 via the disk drive 1100 or the like. Alternatively, the program module 1093 and the program data 1094 may be stored in a different computer that is connected via a network (a LAN, a Wide Area Network (WAN), or the like). Then, the program module 1093 and the program data 1094 may be read by the CPU 1020 from the different computer via the network interface 1070.

The embodiment to which the invention made by the present inventors is applied has been described above, but the present invention is not limited to the description and the drawings that are a part of the present invention disclosed by the embodiment. In other words, all of other embodiments, examples, operational techniques, and the like that may be made by a person skilled in the art on the basis of the embodiment are included in the scope of the present invention.

REFERENCE SIGNS LIST 1 analysis system
2 network
3 analysis apparatus
4 collection apparatus
10 communication unit
20 storage unit
21 category DB
22 known keyword DB
23 known search query DB
24 fitness prediction model
25 whitelist DB
30 control unit
31 search query generation unit
32 fitness prediction unit
33 analysis priority determination unit
311 category input unit
312 first keyword collection unit
313 second keyword collection unit
314 generation unit
321 fitness acquisition unit
322 feature information extraction unit
323 model construction unit
324 prediction unit
331 search order determination unit
332 search performing unit
333 whitelist exclusion unit
334 analysis priority calculation unit

The invention claimed is:

1. A collection apparatus that collects a Uniform Resource Locator of a Web page, the collection apparatus comprising:
a memory; and.
a processor coupled to the memory and programmed to execute a process comprising:

first generating a search query for a search engine by combining a digital content name that is a name of a digital content and an associated keyword of the digital content;

first predicting a degree to which a Web page that leads to user operation is output as a search result when a search is performed by using the generated search query, on the basis of feature information on the search query generated by the first generating;

first determining, searching for a Web page by using a search query in a search order that is among a plurality of search queries,. the search order being based on the degree predicted by the first predicting, and determining analysis priority that is priority for analyzing whether a URL of a retrieved Web page is the Web page that leads to user operation on the basis of the degree of the search query and search result information; and outputting the URL of the Web page retrieved by the first determining and the analysis priority of the URL in an associated manner to an analysis apparatus.

2. The collection apparatus according to claim 1, wherein the first generating includes receiving input of a category of digital data;

first collecting, as a first keyword, an arbitrary digital content name that belongs to the category second collecting, as a second keyword, an associated keyword that is associated with the first keyword when the first keyword is included in a search query for a search engine; and second generating the search query by combining the first keyword and the second keyword.

3. The collection apparatus according to claim 2, wherein the first collecting selects a Web page for each of categories of the digital data, accesses the selected Web page, and extract, as the first keyword, a digital name indicating a product and distribution data, and the second collecting extracts a character string including the first keyword by using a search suggest function and a related search function of a search engine, and extracts, as the second keyword, a character string other than the first keyword from the extracted character string.

4. The collection apparatus according to claim 1, wherein the first predicting includes constructing, cause a prediction model to learn the feature information and the degree of a known search query by which the Web page that leads to user operation is included in a search result and a known search query by which the Web page that leads to user operation is not included in a search result; and second predicting the degree of the search query by using the prediction model, on the basis of the feature information on the search query generated by the first generating.

5. The collection apparatus according to claim 1, wherein the first determining includes second determining a search order of the search query generated by the first generating, on the basis of the degree predicted by the first predicting;

searching for a Web page by using the search query in the search order determined by the second determining;

excluding a URL that is obtained in advance for each of categories and that corresponds to a Web page eliminated from an analysis target of the analysis apparatus, from URLs of Web pages that are retrieved by the searching; and calculating the analysis priority of a URL remaining after exclusion performed by the excluding, on the basis of the degree of the search query, the search order of the search query, and the search result information.

6. A collection method implemented by a collection apparatus that collects a Uniform Resource Locator (URL) of a Web page, the collection method comprising:

generating a search query for a search engine by combining a digital content name that is a name of a digital content and an associated keyword of the digital content;

predicting a degree to which a Web page that leads to user operation is output as a search result when a search is performed by using the generated search query, on the basis of feature information on the generated search query;

searching for a Web page by using a search query in a search order among a plurality of search queries, the search order being based on the predicted degree, and determining analysis priority that is priority for analyzing whether a URL of a retrieved Web page is the Web page that leads to user operation on the basis of the degree of the search query and search result information; and outputting the URL of the Web page retrieved at the determining the analysis priority of the URL, in an associated manner to an analysis apparatus.

7. A non-transitory computer-readable recording medium having stored therein a collection program for causing a computer to execute a process comprising:

generating a search query for a search engine by combining a digital content name that is a name of a digital content and an associated keyword of the digital content;

a step of predicting a degree to which a Web page that leads to user operation is output as a search result when a search is performed by using the generated search query, on the basis of feature information on the generated search query;

searching for a Web page by using a search query in a search order among a plurality of search queries the search order being based on the predicted degree, and determining analysis priority that is priority for analyzing whether a Uniform Resource Locator (URL) of a retrieved Web page is the Web page that leads to user operation on the basis of the degree of the search query and search result information; and outputting the URL of the Web page retrieved at the determining the analysis priority of the URL, in an associated manner to an analysis apparatus.

* * * * *